May 5, 1959  W. J. HOLT, JR  2,885,627
VOLTAGE REGULATING DEVICE
Filed June 10, 1954
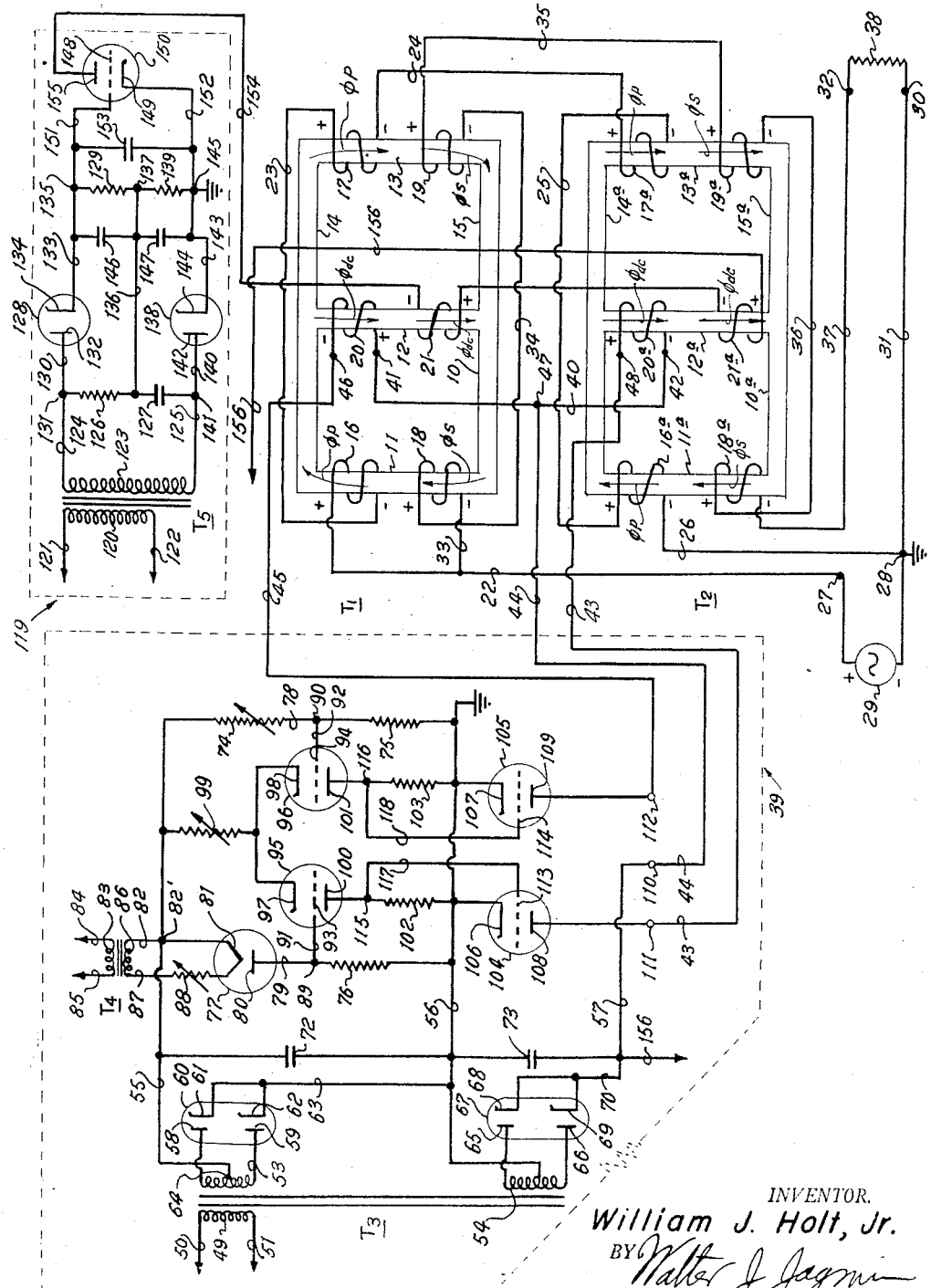
INVENTOR.
William J. Holt, Jr.
BY Walter J. Jagmin
ATTORNEY

United States Patent Office 2,885,627
Patented May 5, 1959

2,885,627

VOLTAGE REGULATING DEVICE

William J. Holt, Jr., Garland, Tex., assignor to Varo Mfg. Co., Inc.

Application June 10, 1954, Serial No. 435,771

1 Claim. (Cl. 323—56)

My invention relates to voltage regulators for controlling the voltage of alternating current circuits.

In order for many electrical devices to attain optimum performance some auxiliary means must be provided to regulate the voltage of various circuits associated with the devices. These circuits may include the input circuit where it is desired to provide a constant input voltage from an unstable supply, the output circuit where it is desired to provide a uniform output in the face of a varying load, and/or an internal circuit where constant operating voltages are required.

While existing voltage regulators are capable of effecting such regulation, those which are energized from an alternating current source are frequently unsatisfactory in that they introduce sizable phase differences between their input and output voltages and develope harmonic components which materially alter the wave form of their output voltages. This necessitates the use of auxiliary equipment to correct for such changes in the voltage which presents serious design limitations in systems where size, weight, and cost are of prime importance.

Accordingly, it is an object of my invention to provide a new and improved voltage regulating device.

It is another object of my invention to provide a device for regulating the voltage of an alternating current circuit without introducing objectionable shifts in phase between the input and output voltage thereof.

It is another object of my invention to provide a device for regulating the voltage of an alternating current circuit without introducing objectionable shifts in phase between the input and output voltage thereof.

It is another object of my invention to provide a device for regulating the voltage of an alternating current circuit without introducing objectionable harmonic components which would distort the wave form of the output voltage thereof.

Another object of my invention is to provide a device for regulating the voltage of an alternating current circuit which includes means for maintaining the output voltage of the device constant in spite of changes in the frequency of the alternating current circuit.

Briefly stated, my invention features a pair of transformers, each having a primary, secondary and two saturating windings. The primary windings of the two transformers are connected in series across a single phase of an alternating current input circuit. One side of the input line is also directly connected to one side of the output circuit of the regulator. The other side of the input circuit is connected to the other side of the output circuit in series with the secondary windings of the two transformers which are connected together in opposed series relation. Each saturating winding of one transformer is connected in a separate series circuit with a saturating winding of the other transformer to form two series circuits each comprising a saturating winding of both transformers. One series connected saturating winding circuit is energized from a voltage sensing control means which is connected between one side of the regulator output and ground to sense variations in the regulator output voltage. The output of the voltage sensing control means is such that for the condition of rated regulator input and output voltage the cores of the two transformers are equally saturated. When the output voltage tends to go above rated value, the voltage sensing control means delivers a greater current to the saturating winding of the transformer whose secondary is of additive polarity with respect to the regulator input voltage. And when the regulator output voltage tends to go below rated value, the voltage sensing control means delivers a greater current to the saturating winding of the transformer whose secondary is of subtractive polarity with respect to the regulator input voltage. With this arrangement the output voltage of the regulator is maintained constant due to the generation of a net subtractive output voltage across the opposed secondary windings with respect to the regulator input voltage for under voltage conditions, and the generation of a net additive output voltage across the secondary windings with respect to the regulator input voltage for overvoltage conditions.

Additionally, the second series connected saturating winding circuit is energized from a control means having an output which varies in accordance to changes in the frequency of the alternating current circuit whereby the output voltage of the regulator can be maintained constant in spite of frequency changes in the alternating current circuit which normally affect voltage.

For a better understanding of my invention reference may be had to the following description taken in conjunction with the drawings.

The figure is a diagrammatical representation of a preferred embodiment of my invention.

In the figure of the accompanying drawing the voltage regulator of my invention comprises two similar saturable transformers, $T_1$ and $T_2$, each having a primary, secondary and two saturation windings. Transformer $T_1$ consists of a magnetic core 10 having three legs 11, 12, and 13 joined by sections 14 and 15; primary windings 16 and 17 and secondary windings 18 and 19 each distributed in equal sections on outer legs 11 and 13, as shown; and two saturation windings 20 and 21 on central leg 12. The primary and secondary windings are distributed in equal sections on the outer legs 11 and 13 to enable the flux set up in center leg 12 by the alternating current in primary winding sections 16 and 17 to be equal and opposite to that of each mating section, thereby eliminating the inducement of alternating current voltages in the saturation windings 20 and 21 on leg 12. The instantaneous polarities of operating alternating current voltages are indicated by (+) and (−) signs for each section of the primary and secondary windings, and the resultant flux paths therefrom are indicated by arrows $\phi p$ and $\phi s$. Since transformer $T_2$ is a duplicate of transformer $T_1$, corresponding elements are numbered the same as in transformer $T_1$ with the letter "a" added thereto.

The primary windings 16, 17, 16a and 17a of transformers $T_1$ and $T_2$ are connected in an additive series circuit by conductors 22 through 26, as shown, between input terminals 27 and 28 which are connected to an unregulated alternating current source 29. It is to be noted that the input terminal 28 is electrically grounded and is connected to output terminal 30 by means of conductor 31, thus maintaining both input terminal 28 and output terminal 30 at ground potential. While these terminals have been shown as grounded it is to be understood the circuit will operate with them tied common but ungrounded.

The secondary windings 18, 19, 18a and 19a, are connected in a series circuit between input terminal 27 and the other output terminal 32 by means of a portion of conductor 22, conductor 33 connected between conductor 22 and one side of secondary 18, conductor 34 connected between the other side of secondary 18 and one side of secondary 19, conductor 35 connected between the other side of secondary 19 and one side of secondary 19a, conductor 36 connected between the other side of secondary 19a and secondary 18a, and conductor 37 connected between the other side of secondary 18a and the output terminal 32. However, as shown by the instantaneous polarities of the secondary windings of each transformer $T_1$ and $T_2$, the polarity of the output voltage of the secondary winding 18, 19 of transformer $T_1$ is of such polarity as to add to, or "boost," the voltage between input terminals 27 and 28, and the polarity of the output voltage of the secondary winding 18a, 19a of transformer $T_2$ is of such polarity as to subtract from, or "buck," the voltage between input terminals 27 and 28.

It is apparent to those skilled in the art without considering the effects of the saturation windings 20, 20a and 21, 21a the above described connection of transformers $T_1$ and $T_2$ with input terminals 27 and 28 and output terminals 32, and 30 is essentially an auto-transformer connection and the "boost" voltage of secondary 18, 19, and "buck" voltage of secondary 18a, 19a will be equal and opposite for the condition of zero load, thus causing the same input voltage applied to input terminals 27 and 28 to exist at the output terminals 32 and 30. However, I have discovered that the "buck" and "boost" outputs of the secondary windings can be utilized to compensate for voltage variations caused by an unstable voltage or those resulting from variations of load 38, both of which would otherwise vary the output voltage of terminals 32 and 30. This compensation can be effected by varying the saturation of "boost" transformer $T_1$ and "buck" transformer $T_2$ in accordance with voltage variations of source 29 and changes in load 38. In order to accomplish this, saturation windings 20 and 20a are provided on the central legs of the cores of transformers $T_1$ and $T_2$, respectively. The saturation windings 20 and 20a are connected to the output of a balanced direct current amplifier of voltage control means 39 by means of jumper 40 connecting end 41 of winding 20 to end 42 of winding 20a; and leads 43, 44, and 45 from the output of voltage control means 39 which are connected to end 46 of winding 20, point 47 of jumper 40, and end 48 of winding 20a, respectively. Since the direction of current flow through winding 20 is from lead 44 to lead 43 and from lead 44 to lead 45 in winding 20a, windings 20 and 20a are wound on their respective cores in such a manner that the resultant flux in the cores 10 and 10a is in the direction of arrows $\phi$ D.C.

The output of control means 39 is such that when the alternating current output voltage is at its rated value the flow of direct current through windings 20 and 20a is substantially equal. However, as the alternating current voltage tends to increase above rated value a larger direct current flows through winding 20 than through winding 20a, and as the alternating current voltage tends to decrease below rated value a larger direct current flows through winding 20a than through winding 20. Since the degree of saturation contributed to each transformer core is directly proportional to the magnitude of direct current flowing in each of windings 20 and 20a and the alternating current impedance of each transformer $T_1$ and $T_2$ is inversely proportional to the degree of saturation of its core, it follows that when the voltage across output terminals 32 and 30 tends to increase over rated value, due to an increase in the voltage of source 29 or a decrease in load 38, the resultant increase in direct current through saturation winding 20 and decrease in direct current through saturation winding 20a causes the secondary voltage of "buck" transformer $T_2$ to increase in magnitude over that of "boost" transformer $T_1$ by an amount equal to the rise in the alternating current voltage so that when this voltage difference subtracts from the voltage appearing across input terminals 27 and 28 the voltage at the output terminals is restored to rated value. On the other hand, if the voltage across output terminals 32 and 30 tends to decrease below rated value, the resultant increase in direct current through saturation winding 20a and decrease in direct current through the saturation winding 20 causes the secondary voltage of "boost" transformer $T_1$ to increase in magnitude over that of "buck" transformer $T_1$ by an amount equal to the decrease in the alternating current voltage so that when this voltage difference adds to the voltage appearing across input terminals 27 and 28 the voltage at output terminals 30 and 32 is restored to rated value.

One voltage sensing and control means capable of energizing saturation windings 20 and 20a in the manner described is designated by the reference character 39. The circuit of voltage sensing and control means 39 includes a transformer $T_3$ whose primary winding 49 can be connected to either input terminals 27 and 28 or outputs 30 and 32 of the regulator through conductors 50 and 51 connected to the ends of the winding. While transformer $T_3$ can be energized from either the input or output of the regulator it is preferable to work from the regulator output to obtain closer tolerances on the regulator output voltage due to the higher voltage swings which would occur if transformer $T_3$ were energized from the regulator input. Transformer $T_3$ is provided with two secondary windings 53 and 54. The outputs of these secondary windings are rectified in a conventional manner to provide a negative direct current voltage between conductor 55 and a grounded common conductor 56 and a positive direct current voltage between conductor 57 and the grounded common conductor 56. This is accomplished by connecting the ends of secondary winding 53 to the plates 58 and 59 of twin diode tube 60 whose cathodes 61 and 62 are connected by conductor 63 to the common conductor 56, and negative conductor 55 to the electrical midpoint 64 of winding 53; and connecting the ends of secondary winding 54 to the plates 65 and 66 of twin diode tube 67 whose cathodes 68 and 69 are connected by conductor 70 to positive conductor 57, and connecting the common conductor 56 to the electrical midpoint 71 of winding 54. Conventional filter condensers 72 and 73 are connected between common conductor 56 and conductors 55 and 57, respectively, to smooth out the full wave pulsations of direct current voltage between these conductors. The direct current provided between conductors 55 and 56 is used to energize a resistive bridge network whose arms comprise resistors 74, 75, 76, and the plate resistance of a temperature limited diode tube 77. Resistor 74 has one end connected to conductor 55 and the other end connected by conductor 78 to one end of resistor 75 whose other end is connected to the common conductor 56, and resistor 76 has one end connected to conductor 56 and the other end connected by conductor 79 to the plate 80 of diode 77 which has one side of its filament 81 connected to negative conductor 55 by conductor 82. Diode 77, whose operation will be described in detail later, has its filament energized from the output terminals 30 and 32 of the regulator through transformer $T_4$. The primary winding 83 of transformer $T_4$ is connected by conductors 84 and 85 to terminals 30 and 32, and the secondary winding 86 has one side connected to one side of filament 81 by conductor 87 through variable resistor 88 and the other side of secondary 86 is connected to the other side of filament 81 through conductor 82 which as previously described is also connected to conductor 55 at the point 82'. The output potential of the bridge network which appears between points 89 and 90 is applied through conductors 91 and 92 to the grids 93 and 94 of triodes 95 and 96, respectively, which comprise the first stage of a balanced direct current amplifier. The first stage of this amplifier is completed by the connection of cathodes 97 and 98 to the negative conductor 55 through the common cathode resistor 99 and the connection of the plates 100 and 101 to the grounded conductor 56 through the respective plate resistors 102 and 103. The second stage of the unbalanced direct current amplifier comprises triodes 104 and 105 which have their cathodes 106 and 107 connected directly to the common grounded conductor 56 and their plates 108 and 109 connected directly to the voltage control and sensing means output terminals 110 and 111. The plate 108 of triode 104 is connected to the positive conductor 57 through saturation winding 20a of the regulator by means of its connection to output terminal 111, conductor 43 which connects to one side of saturation winding 20a, and conductor 44 which connects the other side of saturation winding 20a to output terminal 110. Similarly, plate 109 of triode 105 is connected to positive conductor 57 through saturation winding 20 of the regulator by means of its connection to output terminal 112, conductor 45 which connects to one side of saturation winding 20, and the common conductor 44 which also connects the other side of saturation winding 20 to output terminal 110. The control grids 113 and 114 of the second stage of the amplifier are energized from points 115 and 116 in the plate circuits of tubes 95 and 96, respectively, through interconnecting conductors 117 and 118. The operation of circuit 39 is based on the performance of the temperature limited diode tube 77. It is well known that if the filament of a diode is heated from an alternating current source, the filament emission is proportional to the root mean square value of the alternating voltage current and if the plate voltage of the diode is maintained above the saturation value the plate current of the diode will also be proportional to the root mean square value of the alternating current voltage heating the filament. Since the filament 81 of diode 77 is energized from the output terminals 30 and 32 of the regulator, it is apparent that the emission of filament 81 will vary directly as the output of the regulator and it follows that if the potential between conductors 55 and 56 is maintained sufficiently high to cause saturation of diode 77 the current flow through diode 77 will be proportional to the root mean square value of the output voltage of the regulator. It will be clear to those skilled in the art that if the resistive arms 75 and 76 of the direct current bridge are of equal resistance and the resistance of arm 74 is adjusted to a value equal to the plate resistance of diode 77 for the condition of rated output regulator voltage the output potential of the bridge network terminals 89 and 90 will be a representation of the error in the voltage appearing at the output terminals of the regulator. This error signal is amplified by the two stage balanced amplifier comprising tubes 95, 96, 104, and 105 to cause a corrective current to flow in saturation windings 20 and 20a to provide an appropriate increase or decrease in the output voltage of the regulator to maintain the error in the regulator output voltage at an extremely low value.

For the condition of rated regulator output voltage, the voltage drop in resistor 74 is equal to the voltage drop through diode 77, therefore, the potentials of the bridge terminals 89 and 90 are equal which provides equal biasing of the grids of tubes 95 and 96 of the first stage of the balanced amplifier. Hence, the currents flowing from grounded conductor 56 through the branch comprising plate resistor 102 and tube 95 and the branch comprising plate resistor 103 and tube 96 to the negative conductor 55 through the common cathode resistor 99 will be substantially equal, thereby providing equal potentials at the output points 115 and 116. As indicated, the potentials of output points 115 and 116 determine the bias of grids 113 and 114 of the second amplifier stage, and being equal, cause equal currents to flow through the saturation windings 20 and 20a. It is to be noted that the cathode resistor 99 is adjustable whereby the output of the direct current amplifier can be varied to effect the proper current flow through saturation windings 20 and 20a for the condition of rated regulator output voltage.

When conditions exist which normally would tend to increase the output voltage of the regulator above its rated value, such as, a changing load or an increase in input voltage, the voltage across the primary 83 of transformer $T_4$ increases thereby increasing the temperature of filament 81 which in turn increases the emission of diode 77. The plate resistance of diode 77 thereby decreases with a resultant decrease in voltage drop through diode 77 which unbalances the bridge network. Since the resistances of the remaining arms 74, 75, and 76 are fixed, the only change in current flow in the bridge is in the branch comprising diode 77 and resistor 76, and since the resistance of this arm is reduced it follows that the potential of output terminal 89 becomes more negative while the potential of the output terminal 90 remains the same as for the case of rated regulator output voltage. These potentials are assumed by the directly connected grids 93 and 94 respectively, of the first stage of the amplifier. Since grid 93 of tube 95 is now more negative, the resultant increase in plate resistance of tube 95 causes a larger voltage drop through tube 95 thereby causing the potential of output terminal 115 to be less negative and the potential of cathode 97 of tube 95 and the directly connected cathode of tube 96 to go more negative. Since the potential of grid 94 of tube 96 does not change, the more negative cathode potential causes an increase in conduction through tube 96 which increases the voltage drop in plate resistor 103, thereby causing the potential of output terminal 116 to go more negative. Grids 113 of tube 104 and 114 of tube 105 of the amplifier output stage are, respectively increased and decreased in potential thereby increasing the current flow through tube 104 and the series connected saturation winding 20 and decreasing the current flow through tube 105 and the series connected saturation winding 20a. In accordance with the foregoing discussion of the operation of transformers $T_1$ and $T_2$, a greater "buck" voltage is developed in the secondary of transformer $T_2$ whereby the regulator output voltage is reduced to rated value.

When the output voltage of the regulator tends to decrease, due to an increasing load or decreasing input voltage, the voltage across the primary of transformer $T_4$ also decreases thereby lowering the emission of diode 77. This is opposite to the effect caused by an increase above rated regulator output voltage and results in a less negative potential at bridge output terminal 89 while the potential of the other output terminal 90 again remains at the same value it had for rated regulator output voltage. Since the potential of grid 93 of tube 95 becomes less negative while the potential of grid 94 of tube 96 remains the same as for rated regulator output voltage, the resistance of tube 95 decreases causing the potential of output terminal 115 to be more negative and the potential of cathode 97, and directly connected cathode 98 of tube 96 to be less negative. The potential of the other amplifier output terminal 116, accordingly, becomes less negative since the plate resistance of tube 96 increases due to the potential of cathode 98 moving closer to that of grid 94. The potentials of grids 114 of tube 104, and grid 115 of tube 105, being directly connected to the output terminals 115 and 116, decrease and increase, respectively, thereby decreasing the current flow through tube 104 and saturation winding 20 and increasing the current flow through tube 105 and saturation winding 20a. Such change of current flow in the saturation windings 20 and 20a, as previously described, results in a greater "boost" of voltage in the secondary winding of transformer $T_1$ than "buck" voltage in the secondary of transformer $T_2$ thereby causing a net gain in the voltage at the regulator output terminals to restore the regulator output voltage to rated value.

In order to compensate for variations in the "boost" and "buck" voltages of transformers $T_1$ and $T_2$, resulting from changes in frequency of the alternating current, I have provided second saturation windings 21 and 21a on the center legs of transformers $T_1$ and $T_2$ which are energized from any conventional frequency responsive circuit having a direct current output inversely proportional to the frequency. A representative circuit having such an output is the particular circuit 119 which is shown and is merely representative of such circuits and is covered by the application Serial Number 135,155 of Robert L. Jordan, filed December 27, 1949, now Patent #2,699,499.

Control circuit 119 comprises a transformer $T_5$ whose primary winding 120 is energized from regulator output terminals 30 and 32 through conductors 121 and 122, and whose secondary winding 123 is connected through conductors 124 and 125 to a series circuit comprising resistor 126 and capacitor 127. A unidirectionally conductive device, such as diode 128 and resistor 129, is connected across resistor 126 by means of conductor 130 connecting the end 131 of resistor 126 to plate 132 of diode 128, conductor 133 connecting the cathode 134 of diode 128 to end 135 of resistor 129 and conductor 136 connecting end 137 of resistor 129 to the juncture of resistor 126 and capacitor 127. A similar unidirectionally conductive device comprising diode 138 and resistor 139 is connected across capacitor 127 by means of conductor 140 connecting end 141 of capacitor 127 to the plate 142 of diode 138, conductor 143 connecting cathode 144 of diode 138 to the end 145 of resistor 139, and the connection of the other end of resistor 139 to the common conductor 136. Capacitor 146 is connected across resistor 129 and capacitor 147 is connected across resistor 139 to smooth out the pulsating direct current voltages appearing across these resistors. The combined voltages developed across resistors 129 and 139 are applied to the control grid 148 and cathode 149 of a direct current amplifier comprising triode 150 by means of conductor 151 connecting end 135 of resistor 129 to grid 148 and conductor 152 connecting end 145 of resistor 145 to cathode 149 which is maintained at ground potential by means of ground connection 153. A capacitor 153 is connected between conductor 151 and 152 to smooth out the pulsating combined voltages developed across resistors 129 and 139. The direct current plate potential for the operation of triode 150 is obtained from the direct current supply comprising positive conductor 57 and the grounded conductor 56 of the voltage sensing and control circuit 39 through conductor 154 connecting plate 155 of triode 150 to one end of the series connected saturation windings 21 and 21a and conductor 156 connecting the other end of the series connected saturation windings 21 and 21a to the positive conductor 57 of circuit 39. The connection to cathode 149 is completed through ground.

The operation of circuit 119 is such that if the resistance of resistor 126 and the reactance of capacitor 127 are made equal for a certain alternating current frequency, which frequency is rated frequency for the alternating current system being regulated in this case, and the resistances of resistors 129 and 139 are equal, the voltages developed across resistors 129 and 139 will be equal and opposite for rated frequency. However, as the frequency increases above rated value, the voltage drop across the capacitor 127 decreases and likewise the voltage developed across resistor 139 decreases and the voltage drop across resistor 126, which is not sensitive to frequency, increases as does the voltage across resistor 129, thereby causing the potential of conductor 151 and connected grid 148 to change potential in a positive direction with respect to conductor 152 and connected cathode 149. The opposite effect will occur when the frequency decreases below rated value and for such condition the potential of grid 148 becomes more negative with respect to the potential of cathode 149 than for the value it assumes for rated frequency. In order to prevent positive potentials on grid 148, the value of resistance 126 can be made lower than the reactance of capacitor 127 for rated frequency by an amount sufficient to accommodate anticipated elevations of frequency. Thus, it is seen that the plate current of triode 150 which flow through saturation windings 21 and 21a increases when the frequency is higher than rated value and decreases when the frequency goes below rated value thereby varying the saturation of transformers $T_1$ and $T_2$ in the desired manner to compensate for changes in the voltage of the system being regulated due to changes in frequency.

The foregoing description of the principle of this invention is to be construed as illustrative only, other changes in structure and arrangement of components may be employed without departing from the true scope of this invention as further defined in the appended claim.

I claim:

A device for regulating alternating current voltage comprising an input circuit adapted to be energized from a source of unstable alternating current voltage; an output circuit; an electrical load connected between said output circuit; transformer means having a primary windings circuit, a first and second secondary windings circuit, first, second, third and fourth saturating windings circuits; means connecting said primary windings circuit between the said input circuit; means connecting said first and said second secondary windings in a series circuit with said output circuit with the polarity of said first secondary winding aiding the polarity of said primary winding circuit and the polarity of said second secondary winding opposing the polarity of said primary winding circuit; a first control means responsive to variations in the voltage of said input circuit and variations in said load for varying the relative output voltages of said first and second secondary windings to maintain the sum of the voltage across the primary windings circuit and the output voltages of said first and second secondary windings substantially at a predetermined constant value, said first control means comprised of said first saturating winding coupled with said first secondary winding for varying the output voltage of said first secondary winding and said second saturating winding coupled with said second secondary winding for varying the output voltages of said second secondary winding; means for varying the current in said first and second saturating windings in accordance with voltage of said input circuit and variations in said load; a second control means responsive to the frequency of said input circuit for varying the current in said third and fourth saturating windings in accordance with the frequency of the alternating current voltage of said input circuit for maintaining the voltage of said output circuit substantially uniform regardless of the variations in frequency of said alternating current voltage of said input circuit, said second control means comprised of said third saturating winding coupled with said first secondary winding for varying the output voltage of said first secondary winding and said fourth saturating winding coupled with said second secondary winding for varying the voltage output of said secondary winding.

References Cited in the file of this patent

UNITED STATES PATENTS

| | | |
|---|---|---|
| 2,351,980 | Lee | June 20, 1944 |
| 2,399,185 | Hedding | Apr. 30, 1946 |
| 2,569,500 | Sorensen | Oct. 2, 1951 |
| 2,678,419 | Bennett | May 11, 1954 |
| 2,758,286 | Wible | Aug. 7, 1956 |
| 2,777,987 | Deal | Jan. 15, 1957 |